L. H. BAEKELAND.
ANTIFRICTION DEVICE.
APPLICATION FILED JAN. 28, 1909.
1,054,265.
Patented Feb. 25, 1913.
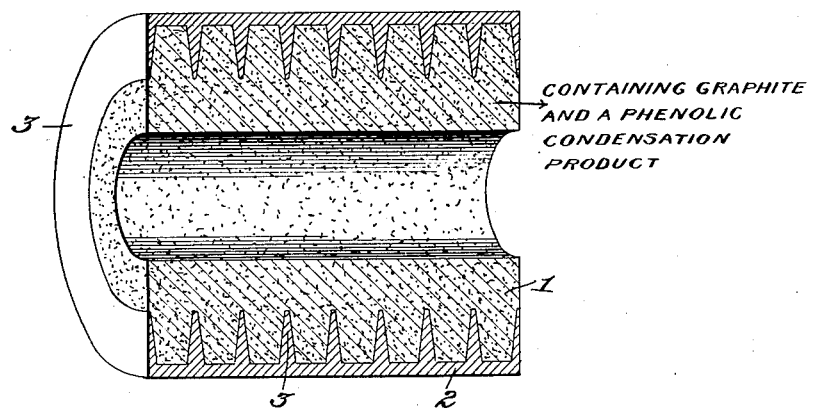

UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

ANTIFRICTION DEVICE.

1,054,265.  Specification of Letters Patent.  Patented Feb. 25, 1913.

Application filed January 28, 1909. Serial No. 474,868.

*To all whom it may concern:*

Be it known that I, LEO H. BAEKELAND, a citizen of the United States, residing at Yonkers, in the county of Westchester and State of New York, have invented certain new and useful Improvements in Antifriction Devices, of which the following is a specification.

This invention relates to the manufacture of anti-friction devices such as bearings, bushings, washers, etc., the object of the invention being the provision of a bearing or like device which is self-lubricating, smooth and durable, which possesses a low coefficient of friction and is not subject to injury by heating. The bearing is well adapted for use in connection with high speed rotary shafts or the like and is efficient under heavy loads. This bearing surface comprises graphite mixed with or incorporated in a hard and infusible condensation product of phenols and formaldehyde, the preferred material being a hard, insoluble and infusible synthetic condensation product resulting from the reaction of formaldehyde upon phenol or a phenolic body under certain conditions as fully described in my copending applications Ser. Nos. 383,684, filed July 13, 1907, 397,560, filed October 15, 1907, and 405,021, filed December 4, 1907. Graphite alone may be incorporated with the material although it is preferred to add a suitable filling having a strengthening or hardening effect, the character and proportion of such filling being such that the coefficient of friction is not unduly increased. As examples of such materials I may mention asbestos, talc, soapstone, wood-pulp, slate, and pulverized metals.

In order to avoid the possibility of undue heating, the bearings, washers, bushings, or the like, are preferably combined with good conductors of heat, usually metals. This may be accomplished for example by incasing the anti-friction material in a metallic envelop, or the metal may be included in or distributed along or through the mass in the form of rings, sections, plain or woven wires, or in pulverulent or granular form, the object in all cases being to assist in conducting from the bearing surface the heat developed by friction. In case pulverulent metals are used, no other filling material may be required. A simple way of applying this principle is to press or mold the anti-friction composition as a lining into a metal bushing, or into the halves of a separable bearing. The metal bushing or bearing may be corrugated or ribbed, or may have any configuration which will increase the surface in contact with the anti-friction composition and facilitate the conduction of heat therefrom.

One application of my invention is illustrated in the accompanying drawing, the figure showing in elevation the inner parts of one of the halves of a separable bearing. The bearing composition 1 is pressed or molded into the metal bushing 2, the latter having ribs or fins 3 to assist in conducting from the bearing the heat developed by friction.

An example of the method of manufacturing a suitable anti-friction bearing in accordance with my invention is as follows: A mixture of about one part by weight of commercial carbolic acid with about one part by weight of commercial 40% formaldehyde is added to about two parts of graphite and two parts of fibrous asbestos or ground wood pulp. This mass is thoroughly mixed and gently heated at about 70° C., for some hours until the synthesis has begun and the odor of formaldehyde begins to disappear, the mixture showing greater stiffness or hardness. The time required for this treatment can be considerably decreased by heating in closed vessels at a higher temperature, or by adding to the carbolic acid or other phenolic body or to the mixture a small amount of a suitable condensing agent as described in the prior applications above referred to. The mass thus obtained can be pressed in suitable molds to the proper shape; or the mass may be cooled, ground, dried and pressed in suitable molds, using for this purpose a hydraulic press or any similar device capable of exerting the necessary pressure. Superior results are attained by heating the molds during this operation. The articles molded in this manner will attain their maximum hardness and strength only after being subjected to a higher temperature for a sufficient period. This can be done during the act of molding, which necessitates a longer use of the mold; or the pressed articles can be removed from the mold and transferred to a vessel where they can be subjected under pressure to increased temperature. This pressure may be obtained as explained in my former applications above referred to either by placing the objects in a chamber into which air is forced under pressure, or by placing them in a vessel containing a suitable gas, vapor or liquid under pressure, heat being applied by any suitable means.

The proportions above referred to, as well as the character of the filler, may be widely varied according to the degree of hardness or strength desired. The greater the proportion of graphite used the higher will be the lubricating properties of the bearing. The proportion of condensation product should be sufficient to insure a strong and homogenous product. The purpose of the filling material is to strengthen or harden the mass, to correct the brittleness of the binder, and to facilitate the operation of molding, or to insure better heat conductivity.

Instead of starting with formaldehyde and a phenolic body, the same result may be obtained by using an initial or intermediate reaction product of phenol and formaldehyde. For example the oily or viscous mass obtained by reacting with formaldehyde on carbolic acid or other phenols may be used instead of the original formaldehyde and carbolic acid. For certain purposes, these oily or viscous products are preferable, facilitating the mixing and securing a quicker final result. Again, it may be advantageous to use the solid initial condensation product or the solid intermediate condensation product which have been described in my prior application, Ser. No. 405,021, above referred to. In this case the mixing and molding may be accomplished as follows: The solid initial or intermediate condensation product is ground and mixed with graphite alone, or with graphite in conjunction with any suitable filling material, and this mixture is introduced into molds of the proper shape and pressed as explained above. The solid initial or intermediate condensation product is capable of transformation by heat into the final infusible condensation product which enters into the composition of the bearing surface, and this heat may be applied either in the mold or subsequent to the molding operation as above explained.

The condensation products above described have been found in practice to possess many distinctive advantages for use in bearings as compared with the soluble and fusible resins; thus (1) the bearings are unaffected by oils and may therefore either be lubricated by oil or used under conditions where contact with oil is unavoidable; (2) they are unaffected by alkalis, alcohol, chlorin and most chemical reagants, and they are therefore available for use in chemical manufacture under conditions which would render impossible the employment either of metal bearings or of bearings containing resins; (3) they are infusible and do not soften or deteriorate at temperatures below about 400° C.; they are therefore not subject to deformation under the influence of heat and pressure; (4) they are far harder than the natural resins, and therefore resist wear and deformation to a far greater degree; (5) these condensation products are however extremely poor conductors of heat and for this reason can best be used in conjunction with good heat conductors, such as graphite or metal, which serve to carry the heat from the bearing surfaces; but so compounded they are found to be far more durable and efficient than any composite bearing heretofore known.

I claim:

1. In an anti-friction device, a self-lubricating bearing composition containing an infusible phenolic condensation product and graphite.

2. In an anti-friction device, a self-lubricating bearing composition containing an infusible phenolic condensation product, graphite, and a filling material.

3. In an anti-friction device, a self-lubricating bearing composition, containing an infusible phenolic condensation product, graphite and a metal.

In testimony whereof, I affix my signature in presence of two witnesses.

LEO H. BAEKELAND.

Witnesses:
H. S. TARBELL,
MARY L. SHORT.